(No Model.)

B. GALLAGHER.
CUTTER HEAD FOR TRIMMING THE HEELS OF BOOTS OR SHOES.

No. 330,008. Patented Nov. 10, 1885.

Witnesses:
Charles H. Fogg.
Chas. J. Conant

Inventor.
Bernard Gallagher
by Alban Andrew
his atty.

N. PETERS, Photo-Lithographer, Washington, D. C.

UNITED STATES PATENT OFFICE.

BERNARD GALLAGHER, OF LYNN, MASSACHUSETTS.

CUTTER-HEAD FOR TRIMMING THE HEELS OF BOOTS OR SHOES.

SPECIFICATION forming part of Letters Patent No. 330,008, dated November 10, 1885.

Application filed May 22, 1885. Serial No. 166,364. (No model.)

*To all whom it may concern:*

Be it known that I, BERNARD GALLAGHER, a citizen of the United States, residing at Lynn, in the county of Essex and State of Massachusetts, have invented certain new and useful Improvements in Rotary Cutters; and I do hereby declare that the same are fully described in the following specification and illustrated in the accompanying drawings.

This invention relates to improvements in rotary cutters, and the device is particularly designed and constructed for the purpose of trimming heels for boots and shoes or sole-edges, although it is equally useful for the purpose of molding, shaping, or trimming other materials and articles, as may be desired.

The invention is carried out as follows, reference being had to the accompanying drawings, where—

Figure 2:
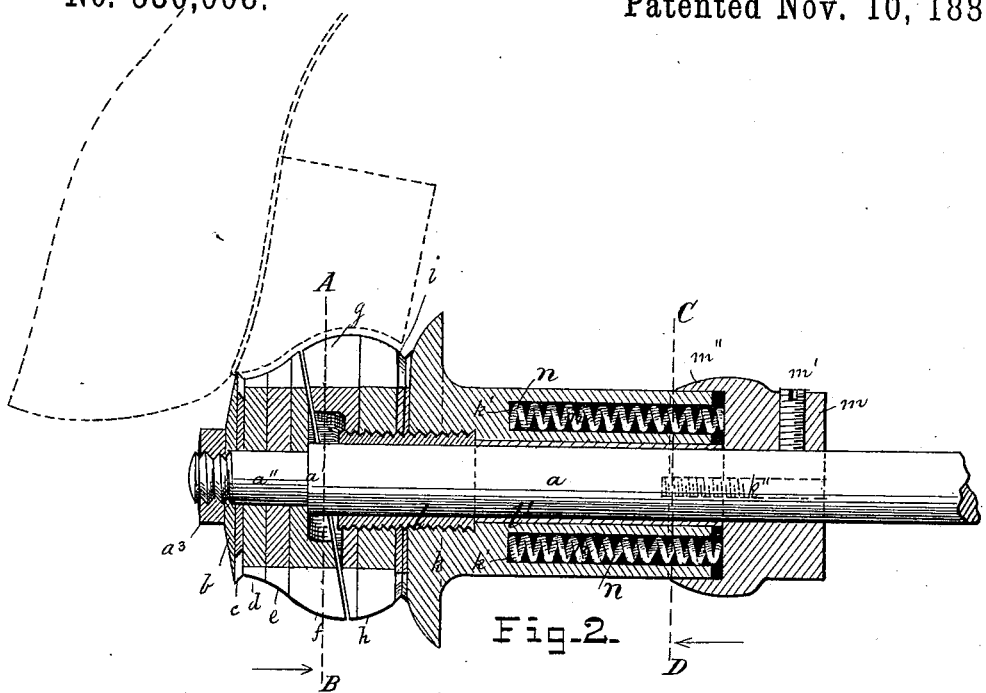
Figure 1:
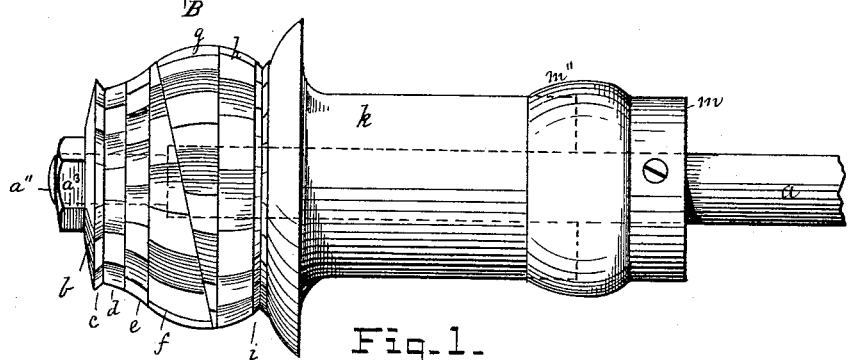
Figure 3:
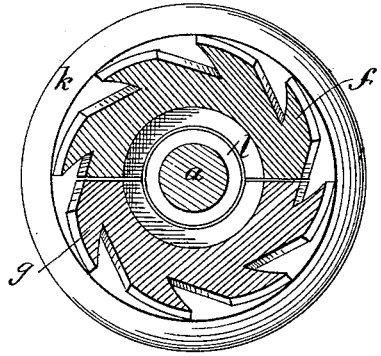
Figure 4:
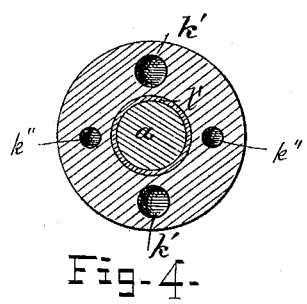

Figure 1 represents a side elevation of the improved rotary cutting device, and Fig. 2 represents a central longitudinal section of the same. Fig. 3 represents a cross-section on line A B shown in Fig. 2. Fig. 4 represents a cross-section on line C D.

Similar letters refer to similar parts, wherever they occur on the different parts of the drawings.

$a$ is the rotary cutter-carrying shaft, adapted to rotate in bearings on a suitable frame in the usual manner. The shaft $a$ has a shoulder at $a'$, beyond which it extends as a reduced spindle, $a''$, screw-threaded in its outer end, and provided with a nut, $a^3$, as shown in Fig. 2. Between the nut $a^3$ and shoulder $a'$ are secured on the spindle $a''$, first, the smooth circular rand-guide $b$, made in the usual form, with a thin outer edge, as shown, and adapted to enter the channel or groove at the junction of the rand and upper, as shown in Fig. 2, so as to prevent the cutter from coming in contact with the upper of the boot and shoe. Next to the rand-guide $b$ comes the toothed rand-cutter $c$, having teeth on its outer periphery for the purpose of cutting the rand, as usual.

$d$ and $e$ are toothed cutters having cutting-teeth on their peripheries, as usual, and molded to the desired shape, according to the work that is to be done.

$f$ and $g$ are toothed cutters respectively secured to spindle $a''$ and longitudinally-yielding gage-hub $k$, as shown in Fig. 2, such cutters having their end faces made at a right angle to the shaft $a$, as shown, their inner faces being made wedge-shaped or inclined—that is, each such cutter is considerably wider in one part of its periphery, as compared with a diametrically-opposite portion thereof, so that the wide portions of said cutters, as it were, overlap each other in diametrically-opposite positions, by which arrangement said cutters may be adjusted to and from each other on the central shaft and still present an outer cutting-surface equal to the distance between the outer square faces of the said cutters when rotated to perform the desired work. This advantage is obtained by having the inner abutting faces of said cutters $f$ and $g$ made wedge-shaped or inclined to the axis of the shaft on which they are located, and overlapping each other, as shown. To the flat end of cutter $g$ is secured the toothed cutter $h$, and between the latter and the forward end of gage-hub $k$ is located the toothed top-lift guard or cutter disk $i$, as shown in Figs. 1 and 2.

The cutters $f$ $e$ $d$ $c$ and rand-guide $b$ are secured firmly on the spindle $a''$ between the shoulder $a'$ and fastening-nut $a^3$, as shown in Fig. 2. The cutters $g$ $h$ and top-lift guard or cutter $i$ are concentrically arranged on shaft $a$, and secured to gage-hub $k$ by means of the screw-threaded sleeve $l$, as shown in Fig. 2. The peripheral cutting-teeth on cutters $f$ and $g$ have a proper clearance or backing off behind their front cutting-edges, as shown in Fig. 3, to prevent the cutters from heating, and to permit the cutting-edges to perform their work properly without clogging. The cutting-teeth on cutters $c$, $d$, $e$, $h$, and $i$ are constructed in a similar manner.

The center of the hub $k$ is bored out sufficiently to receive the cylindrical sleeve $l'$, forming a rear extension of the screw-threaded sleeve $l$, that secures the cutters $g$, $h$, and $i$ to the forward end of hub $k$, as shown in Fig. 2, and by so doing I am able to center said parts most accurately in relation to the shaft $a$, on which they are located. To shaft $a$ is secured, by means of a set-screw, $m'$, the collar $m$, having an annular flange, $m''$, fitting loosely over the end of the gage-hub $k$, as shown in Fig. 2. In the hub $k$ are made recesses $k'$ $k'$, in which are located the coiled springs $n$ $n$, the free ends of which press against the face of collar $m$, so as to cause the wedge-shaped or inclined face of cutter $g$ to be automatically forced against the wedge-shaped or inclined face of cutter $f$ when in their normal positions, as shown in Fig. 1, and to permit cutter $g$ to move away from cutter $f$ against the influence of springs $n$ $n$, according to the inequalities in the height of different parts of the heel as it is being brought in contact with the rotary cutter. During such operation the rand-guide disk $b$ is guided in the groove between the upper and rand, as shown in dotted lines in Fig. 2, while the bottom of the heel is made to rest on the flange of the gage-hub $k$, as shown in said Fig. 2.

In trimming boot and shoe heels it is desirable that the rand outer molded surface, as well as the edge at the junction of such molded surface and the bottom of the heel, should be trimmed at one operation, and for this purpose I make the cutter $i$, nearest to hub $k$, of a concave or V-shaped section, so that one portion of it shall be made to act on the under side of the top lift of the heel, and thus trim off the burr at such place without any subsequent manipulation.

The disk $i$ may be made in two parts, one toothed nearest to hub $k$ and the other portion smooth to serve as a guide against the top lift of the heel. Such smooth guide-disk may revolve or be held stationary by any suitable means, as may be desired.

The flange of hub $k$, on which the under side of the heel rests during the operation of trimming the heel, is made perfectly smooth, so as to serve as a gage or rest only.

$k''$ $k''$ are guide-pins secured to movable hub $k$, and passing into perforations in collar $m$, (or vice versa,) so as to cause the hub $k$, and the disks $g$ $h$ $i$, secured to it, to rotate with shaft $a$ and collar $m$.

Having thus fully described the nature, construction, and operation of my invention, I wish to secure by Letters Patent and claim—

1. In a rotary cutter, the expansive cutting-disks $f$ and $g$, provided with peripheral cutting-teeth, and having their abutting-faces made inclined or wedge-shaped, as and for the purpose set forth.

2. In a rotary cutter, the shaft $a$, having secured to its outer end a rand-guide, $b$, rand-cutter $c$, one or more molded cutters, $d$ $e$, and wedge-shaped or inclined cutter $f$, combined with the longitudinally-yielding gage-hub $k$ and the inclined or wedge-shaped cutter $g$ secured to it, as set forth.

3. In a rotary cutter, the shaft $a$, having secured to it the adjustable collar $m$, combined with the longitudinally-yielding hub $k$ and its springs $n$ $n$ and guide-pins $k''$ $k''$, as and for the purpose set forth.

4. In a rotary cutter, a rand-guide, rand-cutter, one or more molded cutters, and a wedge-shaped or inclined cutter secured firmly to the rotary shaft, in combination with a longitudinally-yielding gage-hub, $k$, inclined cutter $g$, one or more molded cutters, $h$, and cutter $i$, adapted to trim the outer and under portions at the edge of the top lift, as described.

In testimony whereof I have affixed my signature in presence of two witnesses.

BERNARD GALLAGHER.

Witnesses:
ALBAN ANDREN,
CHARLES H. FOGG.